(12) United States Patent
Keller

(10) Patent No.: US 11,264,939 B2
(45) Date of Patent: Mar. 1, 2022

(54) EXTERIOR SIDING MATERIAL WITH INTEGRATED SOLAR PANEL

(71) Applicant: Alexander Keller, Winchester, MA (US)

(72) Inventor: Alexander Keller, Winchester, MA (US)

( * ) Notice: Subject to any disclaimer, the term of this patent is extended or adjusted under 35 U.S.C. 154(b) by 0 days.

(21) Appl. No.: 16/999,924

(22) Filed: Aug. 21, 2020

(65) Prior Publication Data
US 2021/0175839 A1    Jun. 10, 2021

Related U.S. Application Data

(60) Provisional application No. 62/943,465, filed on Dec. 4, 2019.

(51) Int. Cl.
*H02S 20/26* (2014.01)
*E04F 13/08* (2006.01)

(52) U.S. Cl.
CPC .......... *H02S 20/26* (2014.12); *E04F 13/0835* (2013.01); *E04F 13/0864* (2013.01); *E04F 13/0889* (2013.01)

(58) Field of Classification Search
USPC ........................................................ 52/173.3
See application file for complete search history.

(56) References Cited

U.S. PATENT DOCUMENTS

| | | | | |
|---|---|---|---|---|
| 3,120,082 A | * | 2/1964 | Mendelsohn ....... | E04F 13/0864 52/531 |
| 4,102,106 A | * | 7/1978 | Golder ................ | E04F 13/0864 52/533 |
| 4,111,188 A | * | 9/1978 | Murphy, Jr. ............ | F24S 20/67 126/622 |
| 4,172,444 A | * | 10/1979 | Atkinson ................ | F24S 25/61 126/660 |
| 4,271,819 A | * | 6/1981 | Farrell ..................... | F24S 20/69 126/623 |
| 4,327,528 A | * | 5/1982 | Fritz ..................... | E04B 1/7612 52/309.1 |
| 4,327,708 A | * | 5/1982 | Taylor ..................... | F24S 70/16 126/629 |
| 4,392,359 A | * | 7/1983 | Franklin ................ | F24S 20/25 62/235.1 |
| 4,442,827 A | * | 4/1984 | Helman .................. | F24S 30/40 126/617 |

(Continued)

OTHER PUBLICATIONS

International Search Report & Written Opinion dated Feb. 11, 2021 from PCT Application No. PCT/US2020/061513.

*Primary Examiner* — Joshua K Ihezie

(74) *Attorney, Agent, or Firm* — Innovation Capital Law Group, LLP; Vic Lin

(57) ABSTRACT

A siding material for a building configured to hold one or more solar panels is disclosed including a siding shell including a first section and/or a second section, wherein each first and/or second section includes an essentially flat face disposed at an angle ranging from about 30 degrees to about 90 degrees relative to the ground or a perpendicular plane extending from a side of the building. In addition, one or more surfaces of the first section and/or the second section are perforated, and the first section and/or the second section each include a channel configured to hold an electrical cable.

17 Claims, 14 Drawing Sheets

(56) References Cited

U.S. PATENT DOCUMENTS

| | | | | |
|---|---|---|---|---|
| 4,480,633 A * | 11/1984 | Farrell | F24S 20/69 | 126/623 |
| 4,534,336 A * | 8/1985 | Ladriere | F24S 10/753 | 126/633 |
| 4,617,774 A * | 10/1986 | Pittman | E04F 13/0864 | 52/521 |
| 4,750,473 A * | 6/1988 | Dunn | A01G 9/243 | 126/621 |
| 5,303,525 A * | 4/1994 | Magee | E04D 1/30 | 52/306 |
| 5,680,734 A * | 10/1997 | Magee | F24S 23/30 | 52/553 |
| 6,223,488 B1 * | 5/2001 | Pelfrey | E04D 13/152 | 52/302.1 |
| 6,257,302 B1 | 7/2001 | Bednarczyk et al. | | |
| 7,743,571 B2 * | 6/2010 | Vagedes | E06B 7/082 | 52/473 |
| 8,006,455 B1 * | 8/2011 | Mollinger | E04F 13/26 | 52/519 |
| 8,795,813 B2 * | 8/2014 | Olvey | E04C 2/292 | 428/167 |
| 8,898,968 B2 * | 12/2014 | Keller | F24S 25/15 | 52/173.3 |
| 8,978,322 B2 * | 3/2015 | Elliott | H02S 20/23 | 52/173.3 |
| 9,331,630 B2 * | 5/2016 | Van De Wall | G02B 5/09 | |
| 2009/0094914 A1 * | 4/2009 | Jambois | E04F 13/0864 | 52/273 |
| 2014/0007528 A1 * | 1/2014 | Keller | F24S 20/69 | 52/173.3 |
| 2014/0227478 A1 * | 8/2014 | Stucky | E04F 13/0864 | 428/99 |
| 2014/0260000 A1 | 9/2014 | Haynes et al. | | |
| 2014/0311061 A1 | 10/2014 | Keller | | |
| 2015/0082728 A1 * | 3/2015 | Peck | E04F 13/0803 | 52/520 |
| 2015/0222223 A1 * | 8/2015 | Van De Wall | G02B 5/09 | 136/251 |
| 2017/0288600 A1 | 10/2017 | Johnson | | |
| 2018/0262156 A1 * | 9/2018 | Matsuda | H02S 40/34 | |
| 2018/0313547 A1 * | 11/2018 | Reichle | F24S 10/753 | |
| 2020/0141125 A1 * | 5/2020 | O'Neal | E04F 13/0864 | |

* cited by examiner

EXTERIOR SIDING MATERIAL WITH INTEGRATED SOLAR PANEL

CROSS REFERENCE TO RELATED APPLICATIONS

This application claims priority under 35 USC § 119(e) to U.S. Provisional Application No. 62/943,465 filed Dec. 4, 2019, which is herein incorporated by reference in its entirety.

BACKGROUND OF THE DISCLOSURE

Field of the Invention

This disclosure is generally directed to building siding materials including siding materials configured to attach to solar panels.

Description of the Related Art

Buildings account for 39% of CO2 emissions in the US and are a huge contributor to climate change. Solar products on the market now have high installation costs making electrical generation from solar power uneconomical for many buildings and homeowners. Only 22% of residential rooftops in the US are suitable for solar (size of roof, structural limitations, roof age, roof pitch, orientation, shading, skylights, chimneys). The few solar panel products available for wall applications have very complicated installation processes and are very costly.

Additionally, they are installed at a 90 degrees angle on the wall and provide a very low electrical generation output. As can be seen, there is a need for an exterior siding material with integrated solar panels.

SUMMARY OF THE INVENTION

In embodiments, a siding material for a building configured to hold one or more solar panels is disclosed including a siding shell including an first section and a second section, wherein each first and second section includes an essentially flat face disposed at an angle ranging from about 30 degrees to about 80 degrees relative to the ground or a perpendicular plane extending from a side of the building, and further where one or more surfaces of the first section and the second section are perforated, and the first section and the second section each include a channel configured to hold an electrical cable. Typical applications include a tilt range within (30-80 degrees) but an approximately 90 degree tilt (the faces of the first and second section are vertical) is possible as well. This is especially for sides of buildings or homes that have limited solar exposure.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
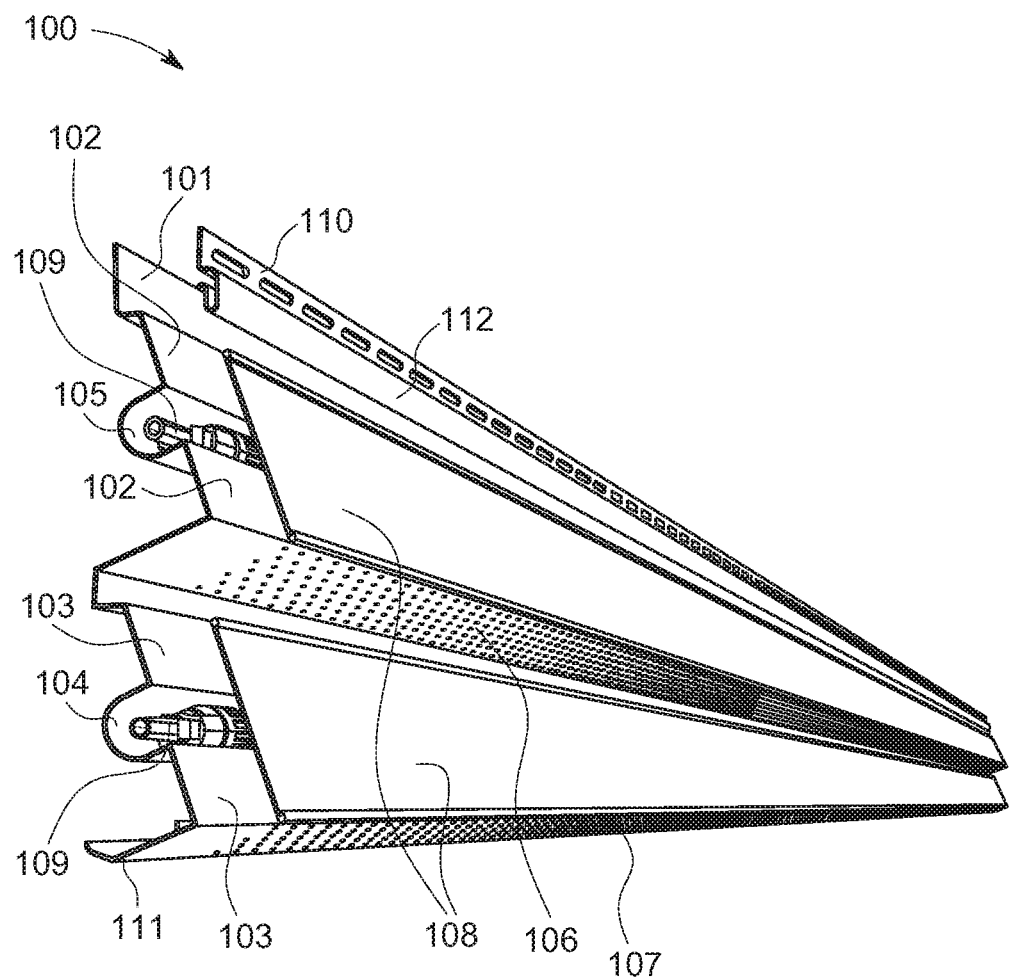
FIG. 1 shows one embodiment of the siding material of the disclosure.

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

The present invention is an exterior siding material with integrated solar (photovoltaic) panel and channel for electrical conduit and connectors. The present invention integrates solar power technology with an easy to install exterior siding material for homes and buildings. This material contains a built-in channel for housing the electrical cables and connectors required for the solar power technology (photovoltaic cells). This material also contains perforations in order to properly ventilate and keep the solar panels from overheating. Since this material gets installed like typical vinyl siding, the installation process is very quick and economical—making solar much more viable and scalable. Since it gets installed on walls of buildings and homes, and is tilted for optimized sun exposure, homes that previously were not suitable for solar panels on the roof (due to limitations mentioned previously) are now able to have a solar panel installation for clean energy generation.

The present invention reduces the effort and cost required to install solar on walls of buildings by utilizing a installation process very similar to typical vinyl siding applications. Furthermore, it provides an application for solar generation for homes that are unsuitable for rooftop solar installations, has a perforated skin that provides air movement to the backside of the solar panel and thus cools it off and prevents a loss of energy generation. Furthermore, since the material has a built-in channel for the electrical conduit, maintenance and repair is very easy. The tilt angle of the invention provides up to 30% more energy compared to existing vertical applications.

Referring now generally to the Figures, the solar panel is attached to the face of the perforated shell with a frame that covers the long edges of the solar panel. The electrical cables of the solar panel are contained within the channel of the perforated shell. The filler panel covers the exposed channel when multiples of the product are installed on a wall.

The perforated shell is comprised of two rows that mimic the dimensions of a typical vinyl siding panel. The two rows are tilted at a specific tilt angle that optimize the sun exposure on the solar panel once the solar panel is attached to the perforated shell. The optimal tilt angle may vary based on geographic locations. For instance, a preferred tilt angle on the east coast of the United States may be different than a preferred tilt angle on the west coast of the United States. The tilt angle may range from about 30 degrees up to about 80 degrees, such as about 67 degrees relative to the ground (horizontal). An approximately 90 degree, vertical application could be installed on the north side of building or home where direct solar exposure may be limited or in shade.

The perforated shell contains a top locking flange at the top and a bottom locking flange at the bottom. The top locking flange is specifically designed to create a gap and a pocket such that when another unit gets installed above this unit, the bottom locking flange of the second unit fits into the pocket of the top locking flange of the first unit and locks it into place. The perforated shell also contains a nailing strip at the very top which is comprised of open slots for hammering nails (or other attachment methods—screws, bolts, etc.) through the perforated shell and into the vertical sheathing or surface of an existing home or building. This nailing strip gets concealed once a second unit is installed above the first unit. The perforated shell also contains a channel. The electrical cables and connectors of the solar panel fit into this channel and allow the solar panel to sit flush on each row of the perforated shell. This channel provides a continuous path for the electrical cables to run along each row and connect each individual solar panel to an adjacent solar panel. The solar panel is secured to the perforated shell by attaching a frame over the long edges of the solar panel to the perforated shell with screws or other connection strategies (bolts, adhesives, etc.). When two units are installed adjacent to one another, a filler panel is installed over the exposed channel on the perforated shell with screws or other connection strategies (bolts, adhesives, etc.).

The solar panel is made by encapsulating photovoltaic cells in a transparent thin film or glass. Electricity generated from the photovoltaic cells is transferred in sheathed copper (or aluminum) wire cable. These cables have connectors at each end which allow them to connect to adjacent solar panels in order to create an electrical string. The perforated shell is made of either a metal or vinyl plastic material. The shape can be made by either extruding the material through a die or by roll forming a coil. The material can then be punched or drilled to create the perforations. The frame is made of either metal or vinyl plastic material. The shape can be made by either extruding the material through a die or through other manufacturing means known to those skilled in the art. The filler panel is made of either a metal or vinyl plastic material. The shape can be made by either extruding the material through a die or by roll forming a coil.

A method of making the present invention may include the following. During the construction of a new home or building (or during a retrofit construction project), multiple units of the present invention are shipped directly to the construction site. They come as long units (12 to 16 feet long). The units get installed one at a time working from the bottom of an existing wall to the top. A construction worker attaches the first row of units to the existing wall structure by hammering nails through the nailing strip on each unit. When two units get installed adjacent to one another, the end of one unit overlaps the adjacent end of the neighboring unit. The top and bottom portions of each end of the units have been removed such that this overlap can occur. The solar panel cables of each adjacent solar panel are connected and secured in the channel of the shell. Once two adjacent units have been installed, a filler panel is attached with screws or nails or other connection strategies (bolts, adhesives, etc.) over the gap that is left between the two units.

Once the first row has been installed, the next row of units above is installed. The bottom locking flanges of the units on the next row above get installed within the top locking flange of the units on the row below. This is done by sliding the bottom locking flange towards the face of the top locking flange and then pulling the bottom locking flange up as high as it will go until it hits the upper most edge of the top locking flange. Once the bottom locking flange is secured to the top locking flange of the bottom row, a construction worker hammers nails or other connection strategies through the nailing strip on the top portion of the unit to attach it to the existing wall structure of the building. Additional units are installed in this manner to complete the second row.

This same process is conducted over again until the desired portion of the wall is installed with the solar siding units. Since the solar siding units mimic the same dimension as typical vinyl panels (or other siding panel materials—wood, aluminum, etc.), the existing wall can be covered with both this invention and typical vinyl siding panels. Once all solar siding units have been installed, the electrical strings that have been made by connecting adjacent solar panels can be connected to an inverter located either near the wall or inside the house. The inverter transforms the DC electricity generated from the solar panels to AC electricity. AC electricity is what is required to power appliances either within the home or building or to connect back to the utility grid.

The solar siding units of the disclosure can be manufactured by standard manufacturing processes used for the manufacturing of standard vinyl siding for homes and buildings.

FIG. 1 shows one embodiment of siding shell 100 of the disclosure. FIG. 1 shows first section 101 comprising essentially planar faces 102 and channel 105 with cable 109, first section 101 also includes perforated cross section 106. FIG. 1 further shows second section 111 with essentially planar faces 103 and channel 104 with electrical cable 109, the second section 111 also including perforated cross section 107. FIG. 1 also shows solar panels 108 connected to the first and second sections of the siding shell 100, nailing strip 110, and upper locking flange 112.

Figure 2:
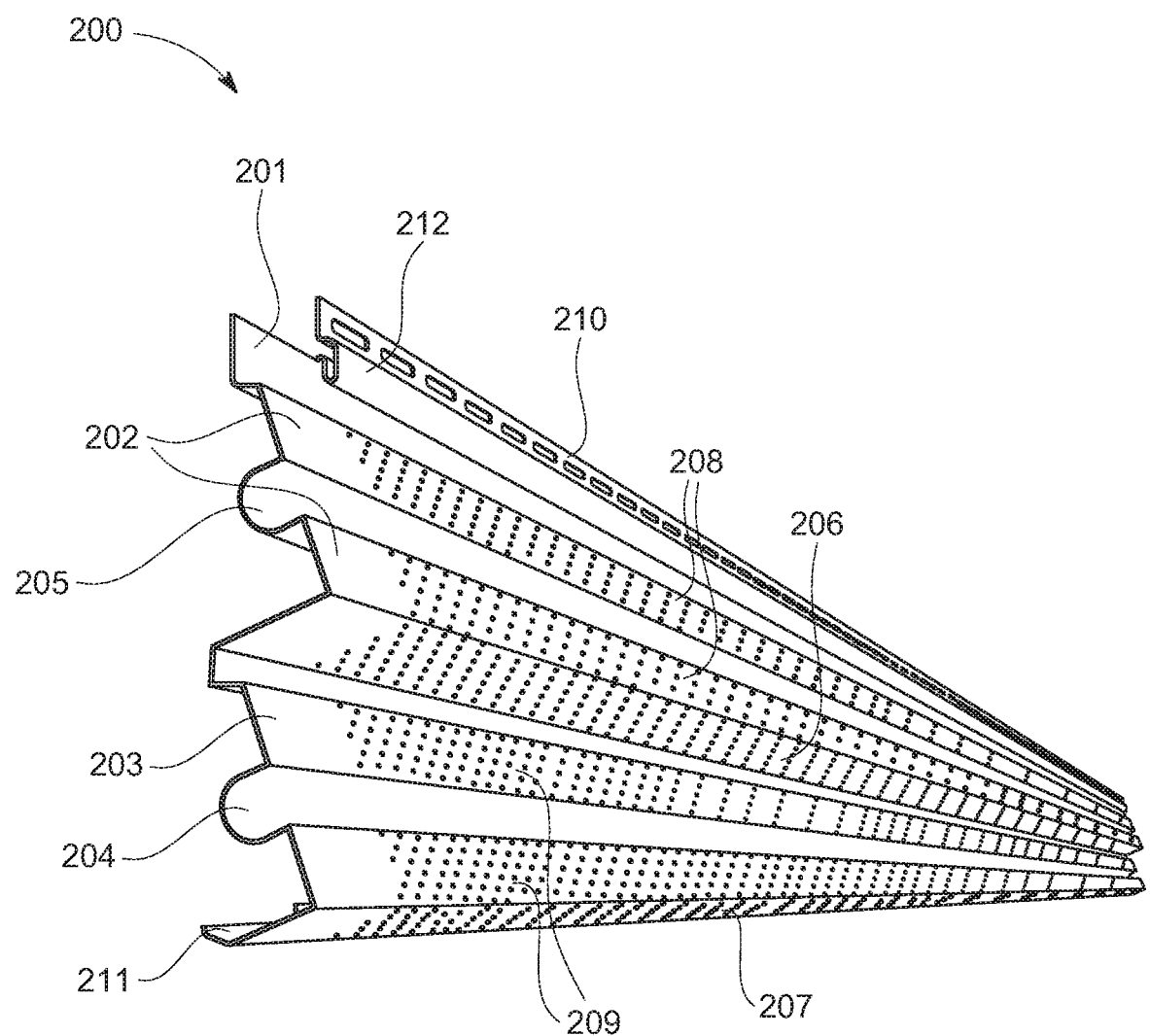
FIG. 2 shows another embodiment of the siding shell of the disclosure.

FIG. 2 shows another embodiment of a siding shell 200 of the disclosure. FIG. 2 shows first section 201 with planar faces 202 and second section 211 with planar faces 203. Each of first section 201 and second section 211 comprise channels 205 and 204 respectively. In siding shell 200, planar faces 202 and 203 comprise perforated sections 208 and 209. First section 201 and second section 211 also include perforated cross sections 206 and 207 respectively. Siding shell 200 also includes nailing strip 210 and upper locking flange 212.

Figure 3:
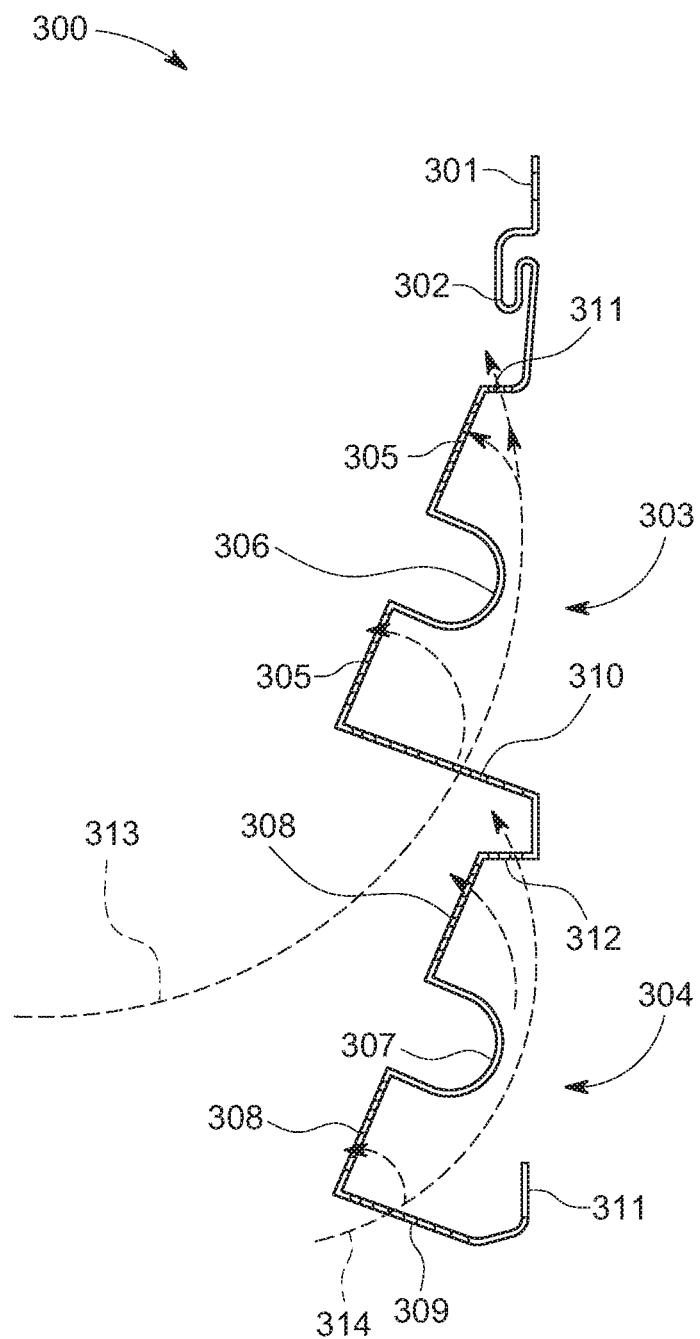
FIG. 3 shows a cross-sectional view of another embodiment of a siding shell of the disclosure.

FIG. 3 shows a cross-sectional view of another embodiment of a siding shell 300 of the disclosure. FIG. 3 shows nailing strip 301 and top locking flange 302 attached to first section 303. First section 303 includes perforated upper cross section 311 and perforated lower cross section 310, perforated flat planar faces 305 and channel 306. Second section 304 includes perforated flat planar faces 308, channel 307, perforated lower cross section 309, perforated upper cross section 312, and lower locking flange 311. FIG. 3 further shows an advantageous air movement pattern through the first section 313 and second section 314 (dashed line arrows) which cools the solar panels.

Figure 4:
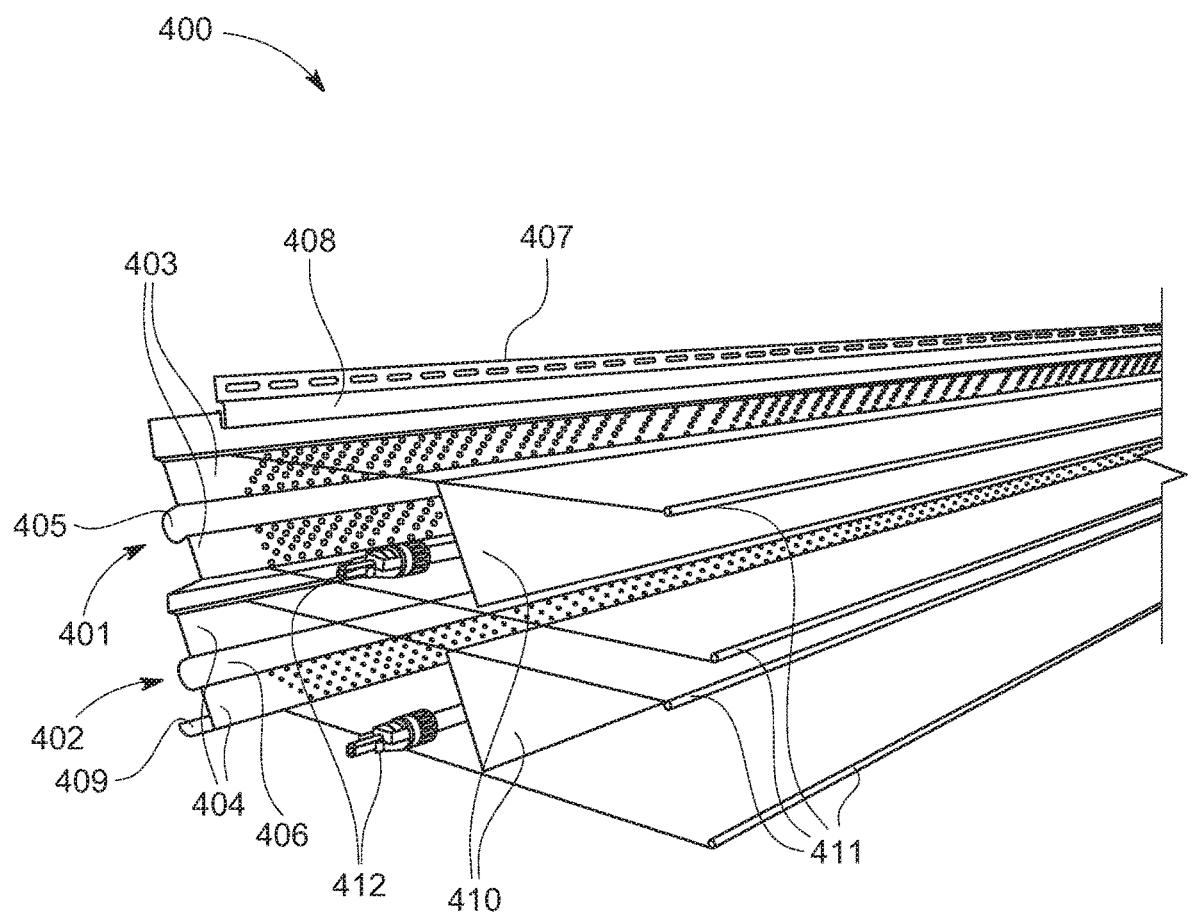
FIG. 4 shows another embodiment of a siding shell number of the disclosure.

FIG. 4 shows another embodiment of a siding shell 400 of the disclosure. FIG. 4 shows first section 401 and second section 402 with planar faces 403 and 404 with perforated cross sections, channels 405 and 406, and electrical cables 412. FIG. 4 further shows nailing strip 407 and top locking flange 408. FIG. 4 also shows solar panels 410 and frames 411.

Figure 5:
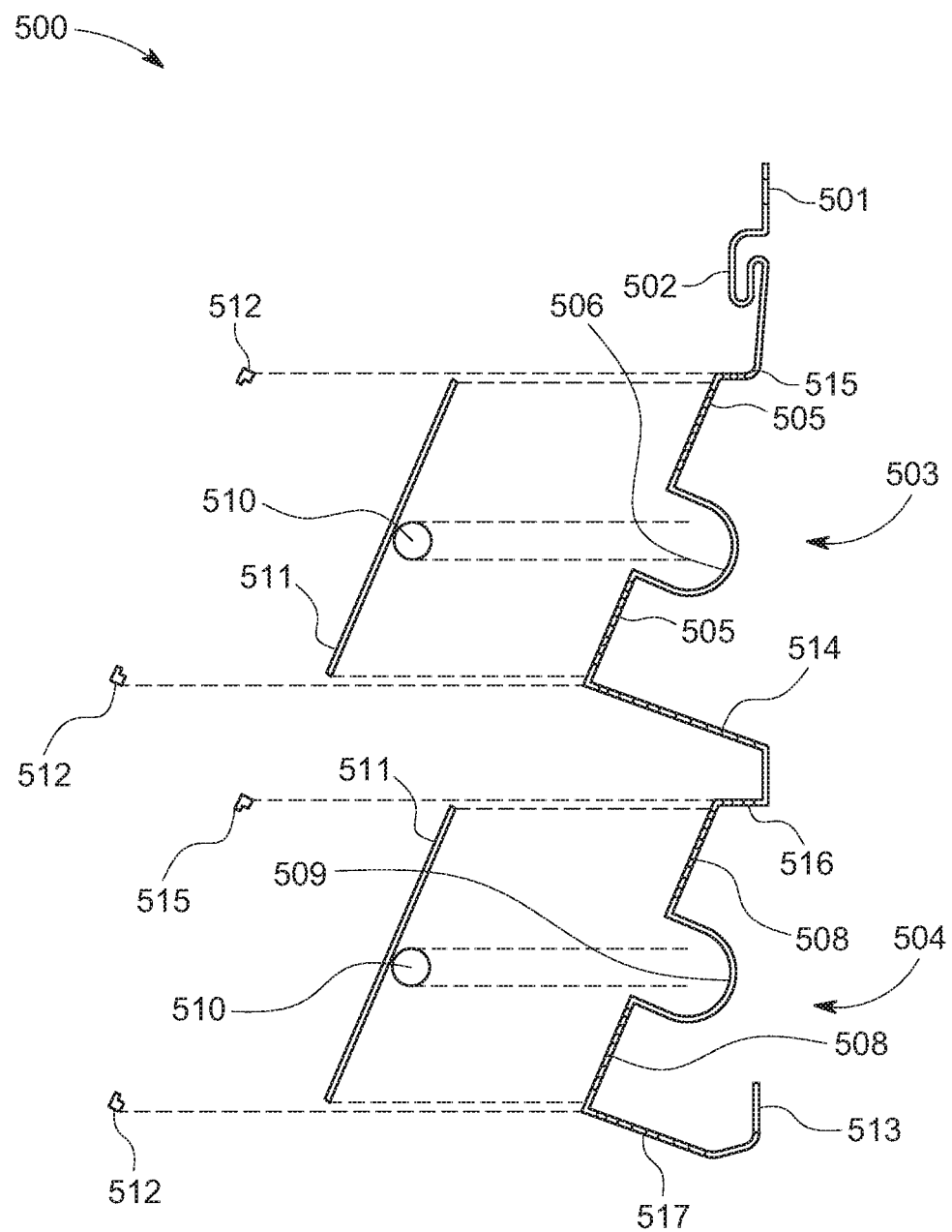
FIG. 5 shows a cross-sectional view of another embodiment of a siding shell of the disclosure.

FIG. 5 shows a cross-sectional view of another embodiment of a siding shell 500 of the disclosure. FIG. 5 shows first section 503 and second section 504 with perforated planar faces 505 and 508. Second section 504 includes bottom perforated cross-section 517 and top perforated cross-section 516 and channel 509. First section 503 also includes bottom perforated cross-section 514 and top perforated cross-section 515 and channel 506. Siding shell 500 also includes nailing strip 501 and top locking flange 502 as well as bottom locking flange 513. FIG. 5 further shows solar panels 511 with frames 512 and electrical cables 510.

Figure 6:
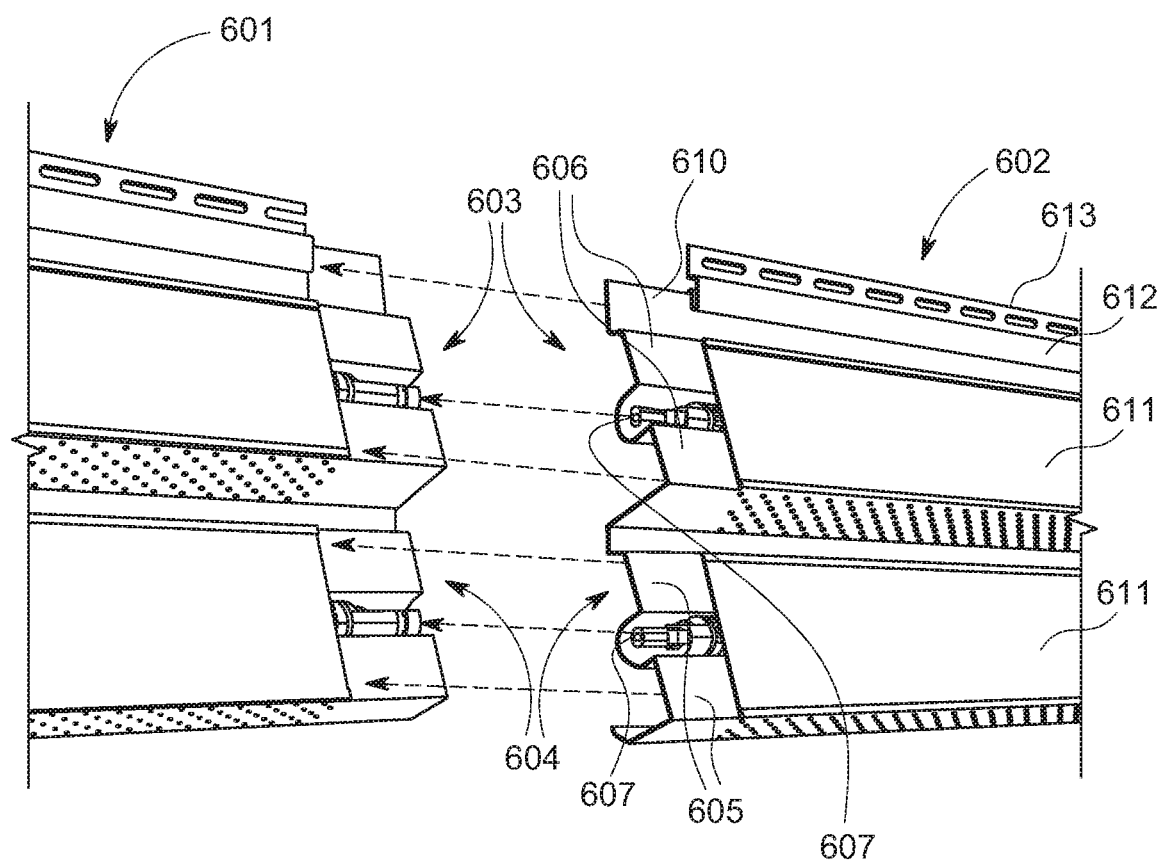
FIG. 6 shows a pair of siding shells of the disclosure.

FIG. 6 shows a pair of adjacent siding shells 601, 602 of the disclosure in the process of being connected. The siding shells 601, 602 include first sections 603 with planar faces 606 and second sections 604 with planar faces 605. First and second sections 603, 604 also include channel and electrical cables 607 capable of attachment. First and second sections 603 and 604 also include solar panels 611 upper flanges 612, and nailing strips 613.

Figure 7:
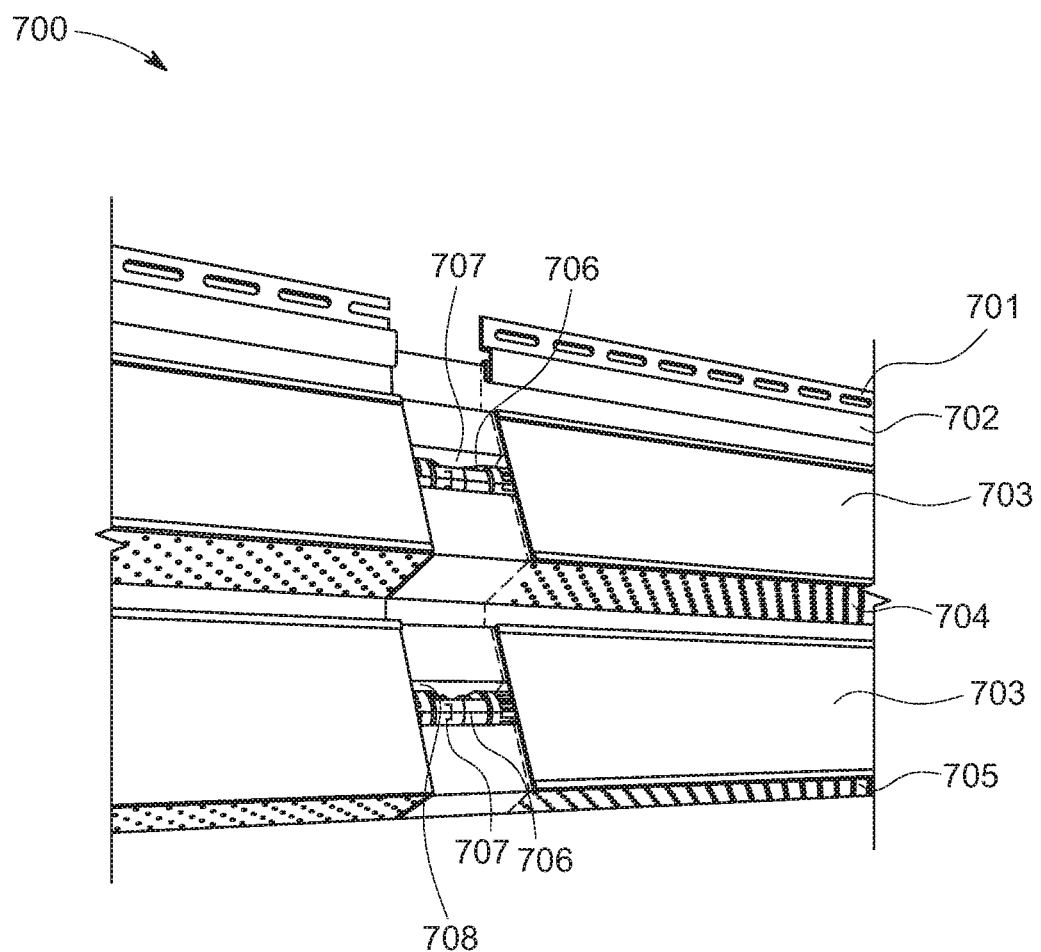
FIG. 7 shows further embodiments of siding shells of the disclosure.

FIG. 7 shows further embodiments of siding shells 700 of the disclosure. FIG. 7 shows nailing strip 701 and top locking flange 702, solar panels 703, bottom perforated cross-sections 704, 705, as well as connected electrical cables 706 disposed in channels 707, 708.

Figure 8:
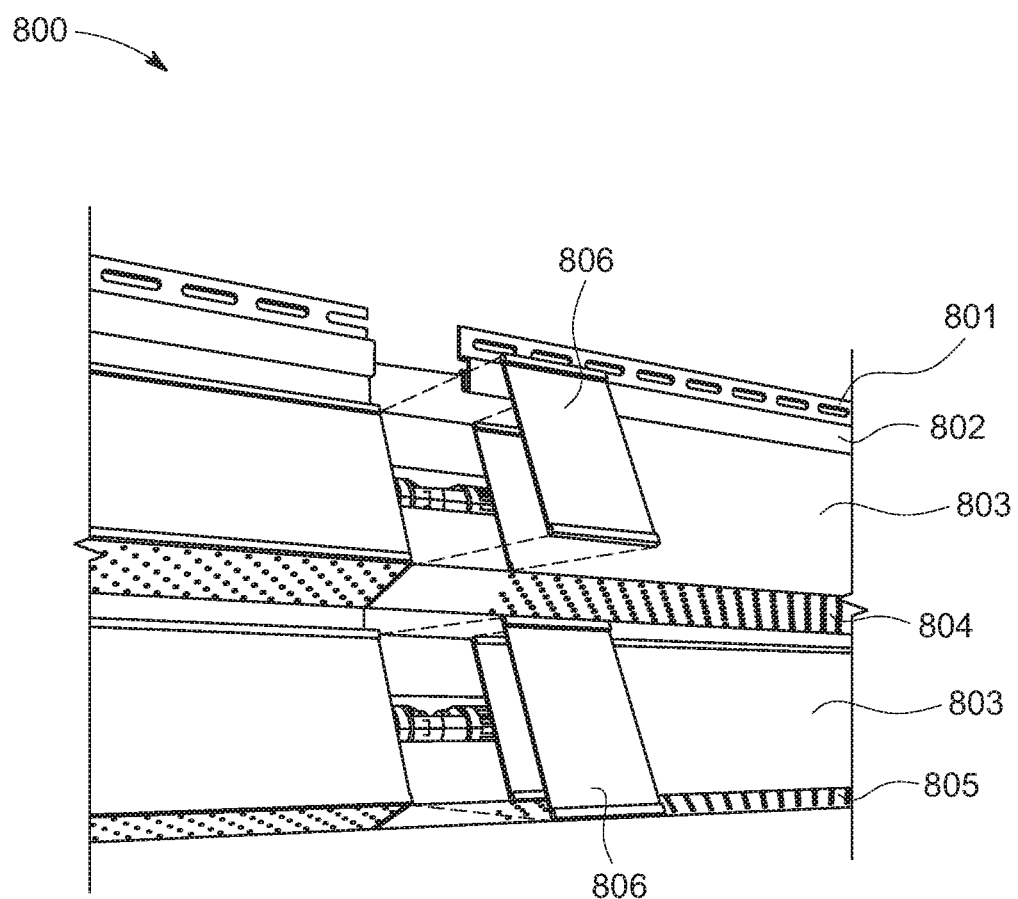
FIG. 8 shows another embodiment of siding shells of the disclosure.

FIG. 8 shows another embodiment of siding shells 800 of the disclosure. FIG. 8 shows nailing strip 801 and top locking flange 802, solar panels 803, bottom perforated sections 804, 805, and filler panels 806.

Figure 9:
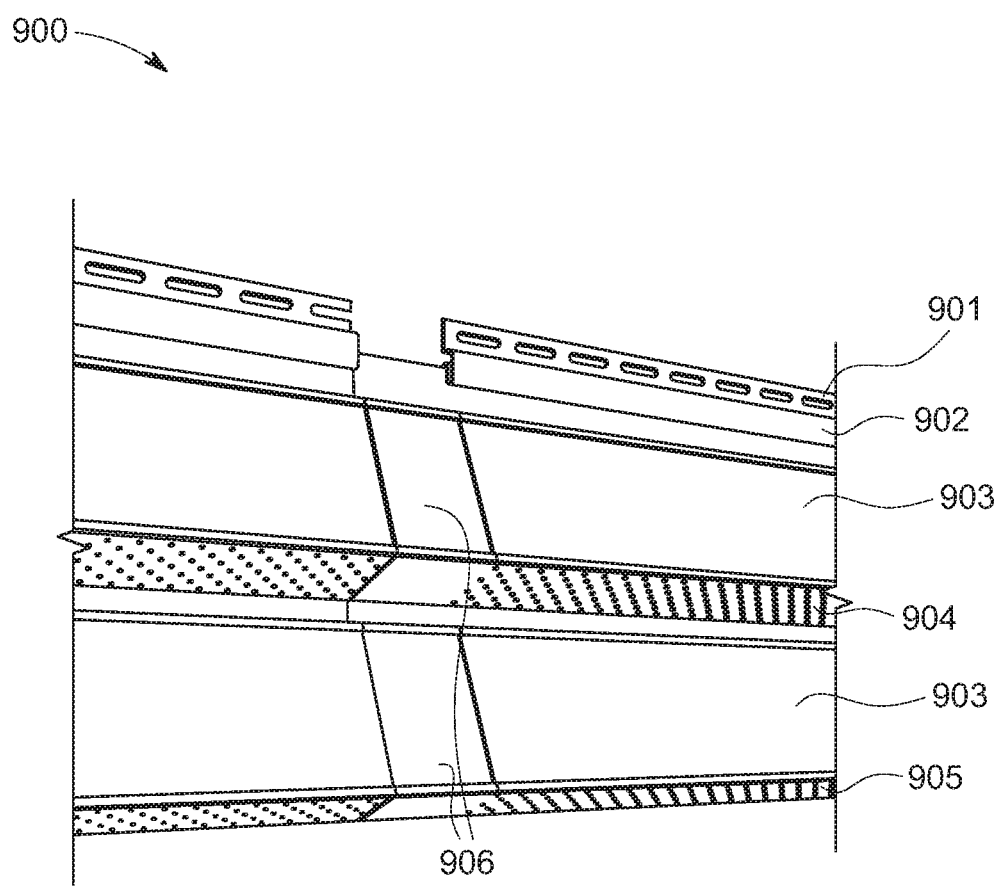
FIG. 9 shows another embodiment of siding shells of the disclosure.

FIG. 9 shows another embodiment of siding shells 900 of the disclosure. FIG. 9 shows nailing strip 901 and top locking flange 902, solar panels 903, bottom perforated sections 904, 905 and attached filler panels 906.

Figure 10:
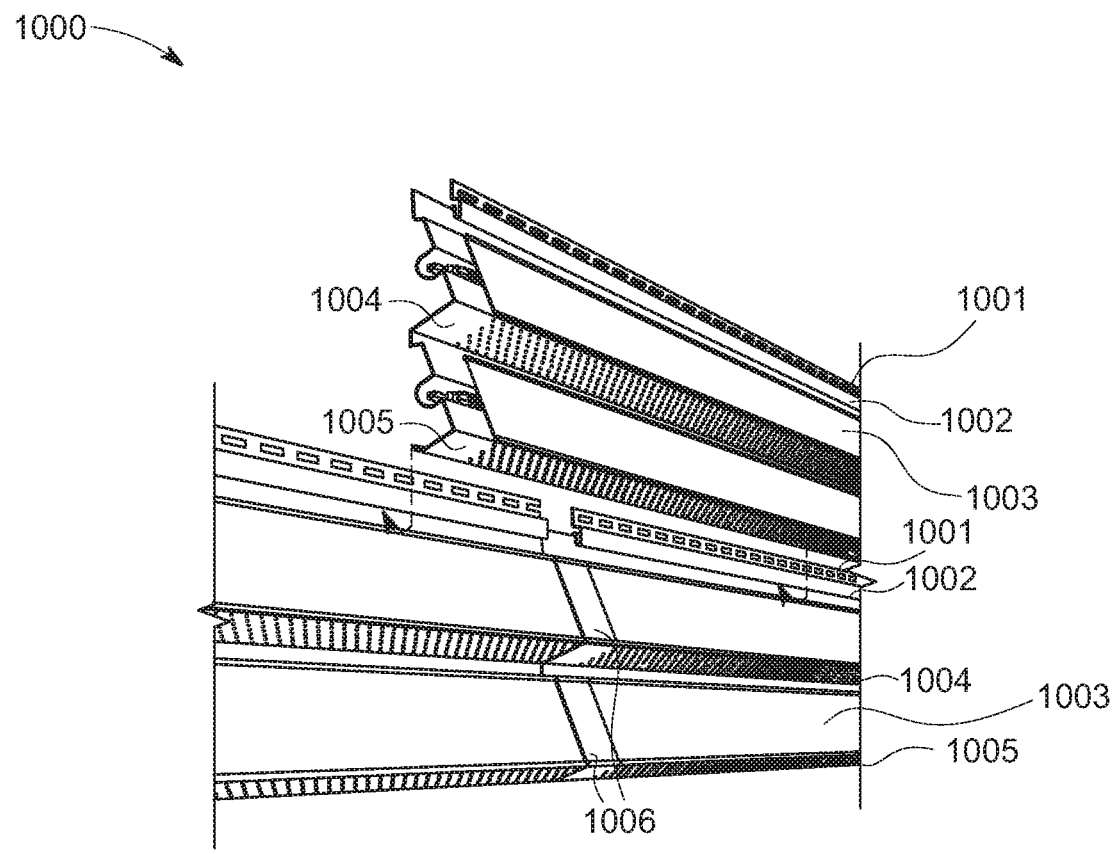
FIG. 10 shows another embodiment of siding shells of the disclosure.

FIG. 10 shows another embodiment of siding shells 1000 of the disclosure. FIG. 10 shows nailing strips 1001 and top flanges 1002 as well as solar panels 1003 and bottom perforated sections 1004, 1005. FIG. 10 additionally shows attached filler panels 1006.

Figure 11:
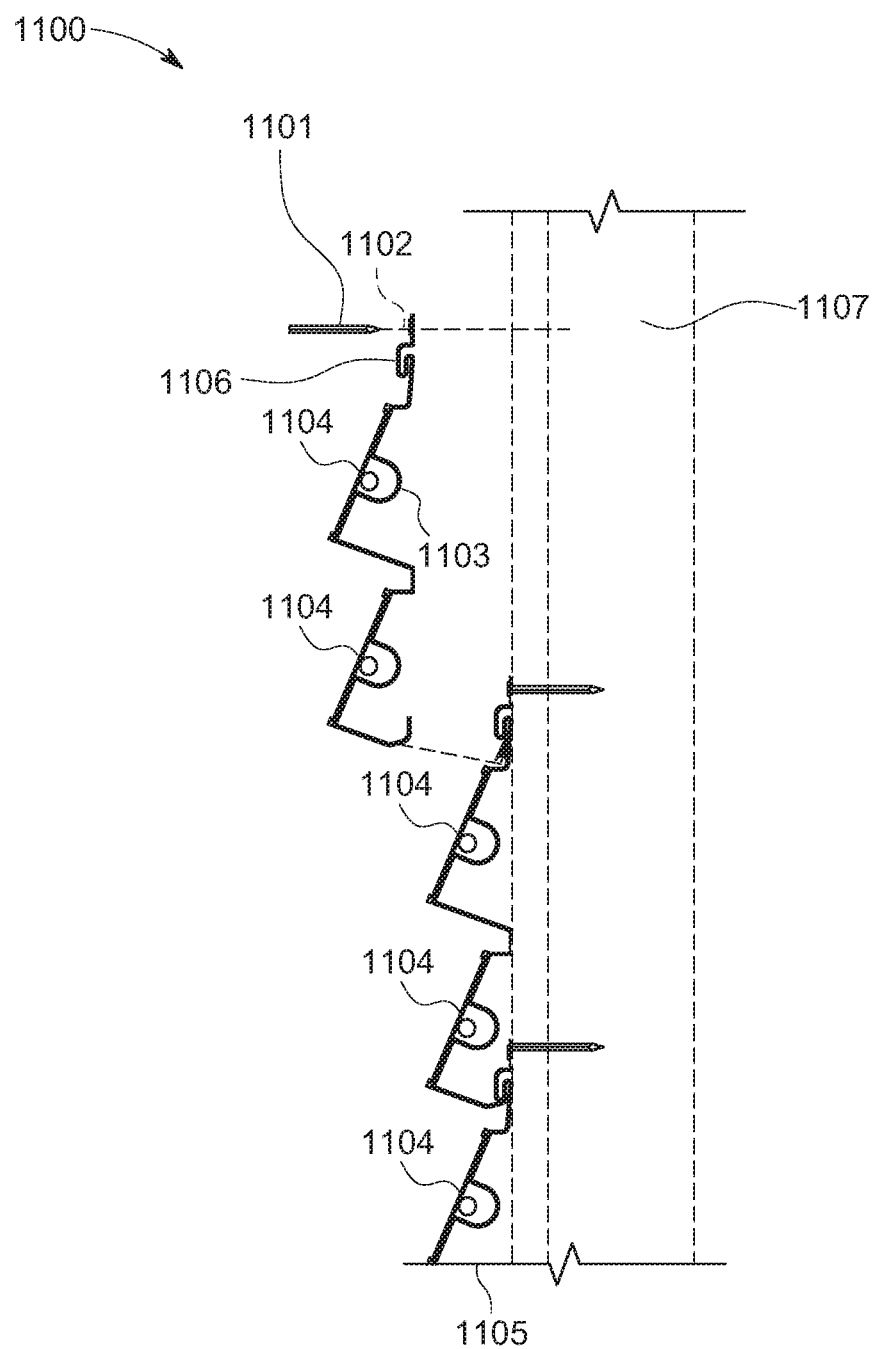
FIG. 11 shows a cross-section of another embodiment of siding shells of the disclosure.

FIG. 11 shows a cross-section of another embodiment of siding shells 1100 of the disclosure. FIG. 11 shows nails 1101 with nailing strips 1102 and locking flanges 1106. FIG. 11 further shows solar panels 1104, the ground 1105, building/structure 1107 and channels with electrical cable 1103.

Figure 12:
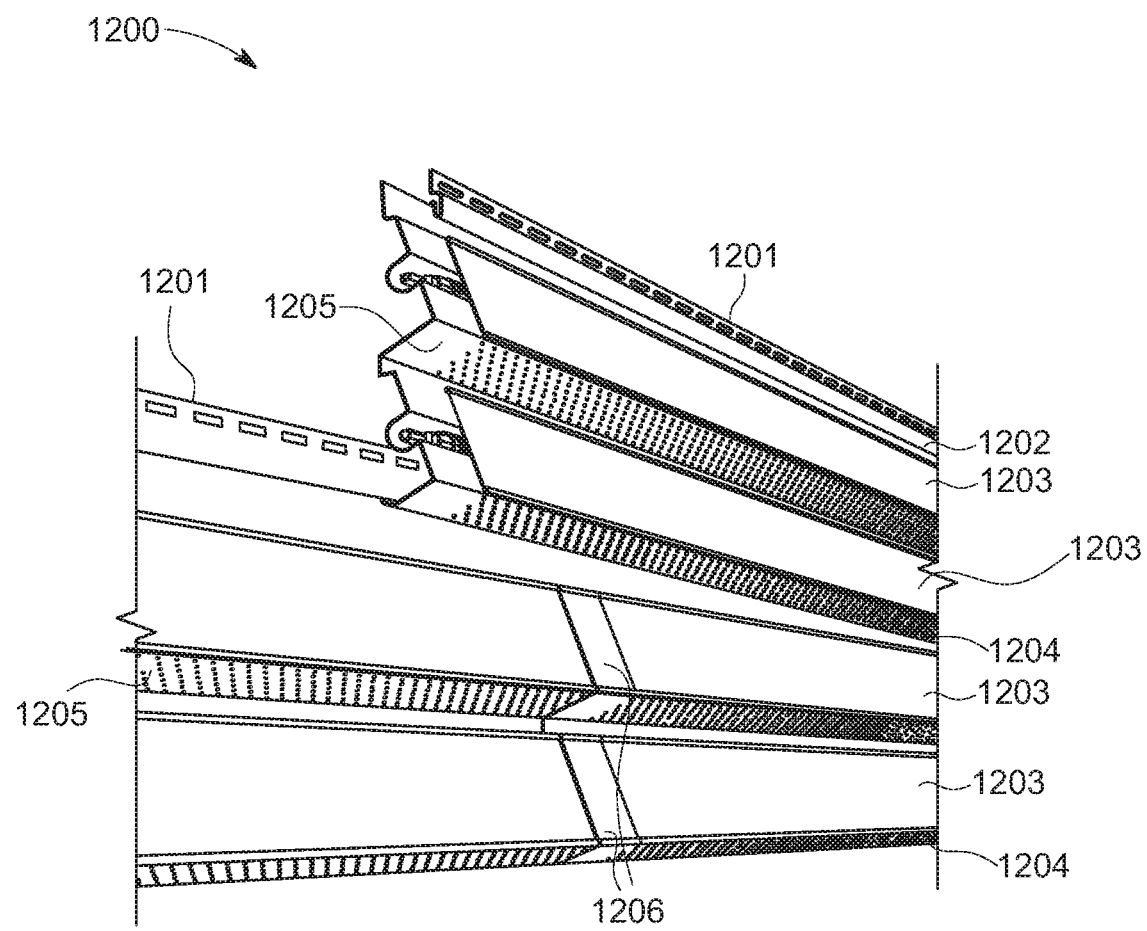
FIG. 12 shows another embodiment of siding shells of the disclosure.

FIG. 12 shows another embodiment of siding shells 1200 of the disclosure. FIG. 12 shows nailing strips 1201, top flanges 1202, solar panels 1203, and bottom perforated sections 1204, 1205, and filler panels 1206.

Figure 13:
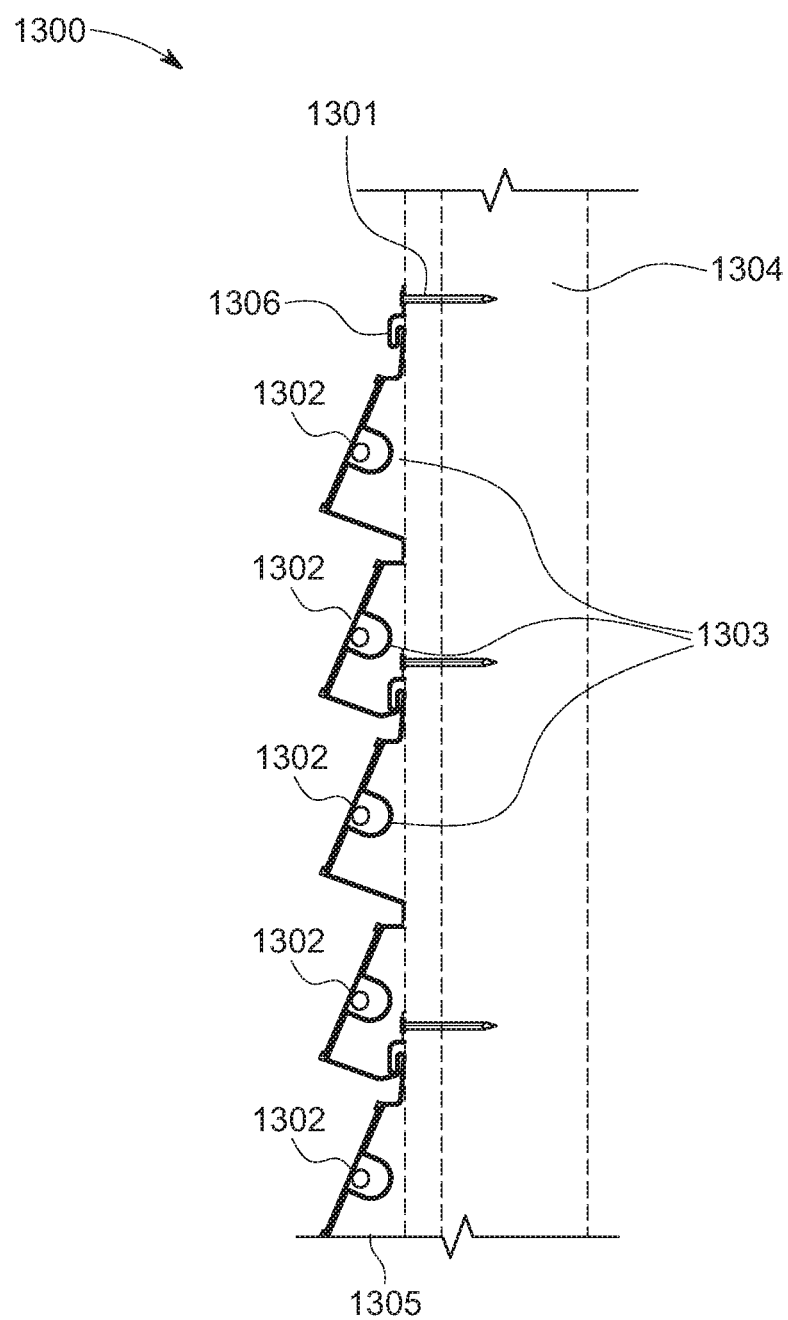
FIG. 13 shows a cross-section of another embodiment of siding shells of the disclosure.

FIG. 13 shows a cross-section of another embodiment of siding shells 1300 of the disclosure. FIG. 13 shows nails 1301, locking flanges 1306, solar panels 1302, channels with electrical cables 1303, building or structure 1304, and the ground 1305.

Figure 14:
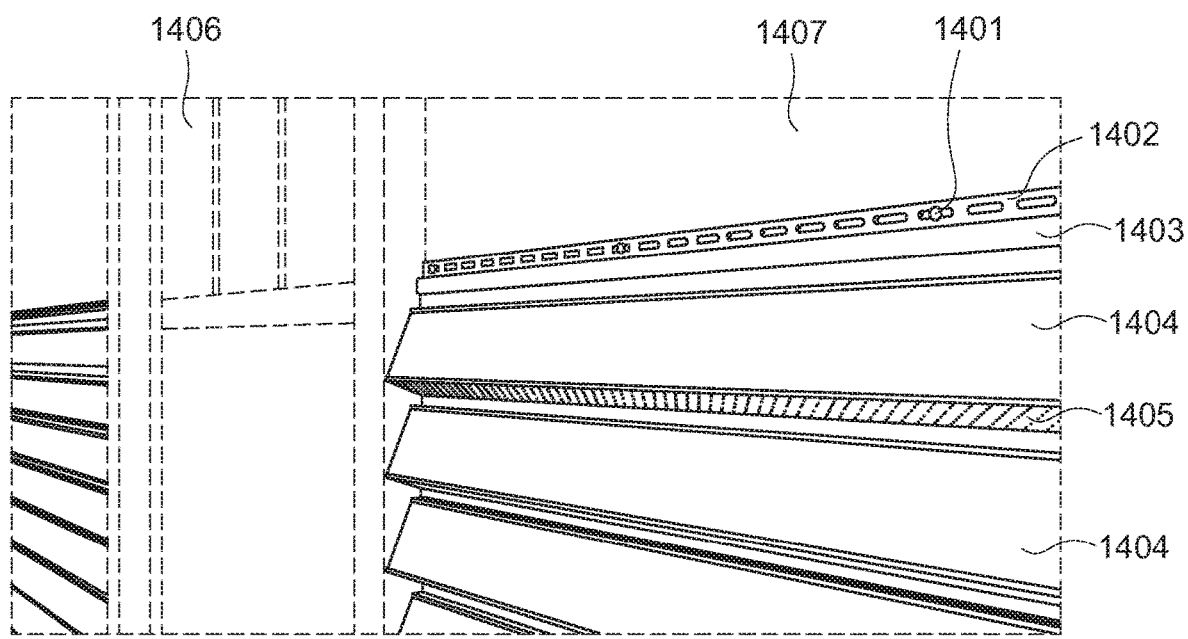
FIG. 14 shows another embodiment of siding shells of the disclosure.

FIG. 14 shows another embodiment of siding shells of the disclosure. FIG. 14 shows nailing strips 1402 with nails 1401, and solar panels 1404 with bottom perforated cross-section 1405. FIG. 14 further shows building or structure 1407 with window 1406.

As used herein, solar panels generally refer to modules comprising an assembly of photovoltaic cells mounted in a framework for installation. Photovoltaic cells use sunlight as a source of energy and generate direct current electricity. A collection of cells is called a solar panel which can be used.

In preferred embodiments, solar panels of the disclosure are sized similarly to vinyl siding strips commonly used, for example, in residential and business building structures.

Vinyl siding is generally plastic exterior siding for houses and small apartment buildings, used for decoration and weatherproofing, imitating wood clapboard, board and batten or shakes, and used instead of other materials such as aluminum or fiber cement siding. It is an engineered product, manufactured, for example, from polyvinyl chloride (PVC) resin.

While this disclosure includes specific examples, it will be apparent after an understanding of the disclosure of this application has been attained that various changes in form and details may be made in these examples without departing from the spirit and scope of the claims and their equivalents.

I claim:

1. A siding material for a building configured to hold a solar panel comprising:
    a siding shell comprising a section comprising an essentially flat face disposed at an angle ranging from 30 degrees to 90 degrees relative to the ground or a perpendicular plane extending from side of the building;
    a first perforated section extending from and formed integrally with a top edge of each flat face, the first perforated section spacing the top edge of the first perforated section a first distance from the building;
    a second perforated section extending from and formed integrally with a bottom edge of each flat face, the second perforated section spacing the bottom edge of the second perforated section a second distance from the building; and
    a channel formed in and open to the flat face, the channel having a solid, continuous channel wall, the channel configured to hold an electrical cable, the channel having a depth to create a space between the channel wall and the building when the siding material is installed on the building.

2. A siding material for a building configured to hold one or more solar panels comprising:
    a siding shell comprising at least one of a first section and/or a second section, wherein each first and/or second section comprises an essentially flat face disposed at an angle ranging from 30 degrees to 90 degrees relative to the ground or a perpendicular plane extending from side of the building, and further wherein one or more surfaces of the first section and/or the second section is perforated;
    a first perforated section extending from and formed integrally with a top edge of each flat face, the first perforated section spacing the top edge of the first perforated section a first distance from the building;
    a second perforated section extending from and formed integrally with a bottom edge of each flat face, the second perforated section spacing the bottom edge of the second perforated section a second distance from the building; and
    the first section and/or the second section each comprise a channel, formed in and open to the flat face, the channel having a solid, continuous channel wall, the channel configured to hold an electrical cable, the channel having a depth to create a space between the channel wall and the building when the siding material is installed on the building.

3. The siding material of claim 2, further comprising a top attachment mechanism and a bottom attachment mechanism for attaching two adjacent siding shells together.

4. The siding material of claim 3, wherein the top attachment mechanism and bottom attachment mechanism comprise locking flanges.

5. The siding material of claim 2, further comprising an attachment mechanism for attaching the siding shell to a wall of a building.

6. The siding material of claim 5, wherein the attachment mechanism is a nailing strip.

7. The siding material of claim 2, wherein each essentially flat section is perforated.

8. The siding material of claim 2, wherein the first section and the second section of the siding shells are integrally formed.

9. The siding material of claim 2, further comprising a solar panel attached to one or more of the first and/or second sections.

10. The siding material of claim 9, further comprising a frame that covers one or more edges of an attached solar panel.

11. The siding material of claim 2, wherein two or more siding shells are connected together.

12. The siding material of claim 11, further comprising one or more filler solar panels for covering an exposed channel.

13. A method of using the siding material of claim 1, comprising:
    attaching the siding material to the side of a house or a building.

14. A siding material for a building configured to hold one or more solar panels comprising:
    a siding shell comprising at least one of a first section and/or a second section, wherein each first and/or second section comprises an essentially flat face disposed at an angle ranging from 30 degrees to 90 degrees relative to the ground or a perpendicular plane extending from side of the building, and further wherein one or more surfaces of the first section and/or the second section is perforated;
    a first perforated section extending from and formed integrally with a top edge of each flat face, the first perforated section spacing the top edge of the first perforated section a first distance from the building;
    a second perforated section extending from and formed integrally with a bottom edge of each flat face, the second perforated section spacing the bottom edge of the second perforated section a second distance from the building; and
    the first section and/or the second section each comprise a channel configured to hold an electrical cable, wherein
    two or more siding shells are connected together; and
    one or more filler solar panels for covering an exposed channel, the exposed channel being open to the flat face and having a depth to create a space between a channel wall and the building when the siding material is installed on the building.

15. The siding material of claim 14, wherein each essentially flat section is perforated.

16. The siding material of claim 14, further comprising a solar panel attached to one or more of the first and/or second sections.

17. The siding material of claim 15, wherein the exposed channel is formed between adjacent ones of the solar panel.

* * * * *